April 12, 1949.    F. M. LITTELL    2,466,717
AIR VALVE CLAMP
Filed Jan. 15, 1947
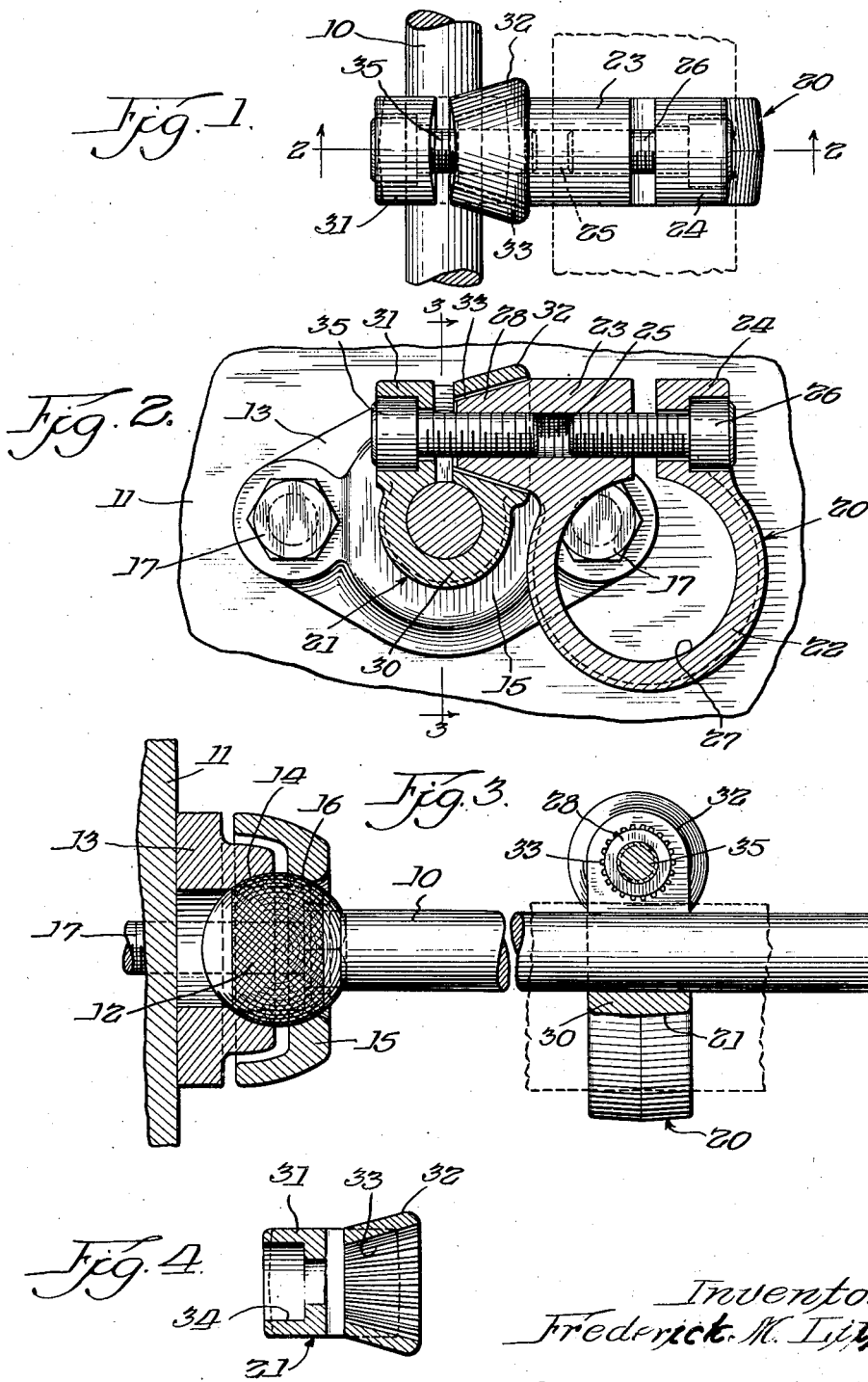
Inventor:
Frederick M. Littell Patented Apr. 12, 1949

2,466,717

UNITED STATES PATENT OFFICE 2,466,717

AIR VALVE CLAMP

Frederick M. Littell, Detroit, Mich., assignor to F. J. Littell Machine Company, Chicago, Ill., a corporation of Illinois Application January 15, 1947, Serial No. 722,139

4 Claims. (Cl. 287—54)

The invention relates to adjustable clamping means for supporting air valves or similar devices and has reference in particular to clamping means comprising split-ring members capable of rotative adjustment in assembled relation to provide an adjustable mounting for the articles supported thereby.

An object of the invention resides in the provision of novel clamping means including a pair of split-ring members having adjustable securement to each other by means of a cone and socket portion provided by the members respectively, whereby full rotative adjustment is possible.

A more specific object of the invention is to provide split-ring clamping members having infinite rotative adjustment in assembled relation to form a universal clamp and which members can be securely fastened in any rotative position.

Another object resides in the provision of a clamp as described wherein one split-ring member includes a socket portion having serrations in its surface and wherein the other split-ring member is provided with a smooth surfaced cone portion adapted to be received by the socket portion whereby the members may be securely united in any rotative position.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a top plan view of the clamping means of the invention shown in secured relation to a supporting arm;

Figure 2 is a transverse sectional view taken substantially along line 2—2 of Figure 1 showing improved structural details of the present clamping means;

Figure 3 is a longitudinal sectional view taken substantially along line 3—3 of Figure 2; and Figure 4 is a longitudinal sectional view of the clamping ring member having the serrated socket portion.

In the drawings, the embodiment of the present clamp selected for illustration is shown in secured relation to an arm 10 which may project horizontally from a wall such as 11. The arm may be supported from said wall by a ball and socket joint consisting of the ball 12 integral with arm 10, the base 13 providing the seat 14 for receiving the ball and a cap 15 likewise having a seat 16, which, however, is opposed to seat 14. The separable portions, namely, the base 13 and cap 15, are securely bolted together by the bolts 17 which are also employed for bolting the base 13 directly to the wall 11 which may constitute the frame of a machine or the like. The ball 12 is provided with a knurled exterior surface so that the same is fixedly and securely held by pressure applied thereto by cap 15 when the same is bolted to base 13. It will be understood that by loosening the bolts 17 the ball 12 may be adjusted as regards its position with respect to base 13 and thus the position of the arm 10 is also varied.

As best shown in Figure 2, the present adjustable clamp essentially consists of a clamping member in the form of a split ring designated in its entirety by numeral 20, and a second clamping member indicated in its entirety by numeral 21, also in the form of a split ring. The split ring clamping members may be of the same size or they may vary in size as regards the diameter of the opening in the ring. As illustrated, the member 20 is of a larger size than member 21 and, whereas, 21 has clamping relation with the arm, the member 20 is adapted to clamp the article to be secured thereby. The ring 22 of member 20 is provided with portions 23 and 24, said portions being disposed on the respective sides of the split in the ring and each portion having a threaded opening such as 25 extending therethrough for receiving the clamping bolt 26. It is preferred that the clamping bolt pass freely through portion 24 and that said bolt have threaded securement with portion 23. As a result of such structure, rotation of the bolt in one direction will draw the portions 23 and 24 together to effect clamping action on an article such as an air valve retained within the circular opening 27 of clamping member 20 and rotation of the bolt in an opposite direction will release said clamping action. In accordance with the invention portion 23 is provided with a conical nose designated 28 and which is smooth surfaced. The threaded opening 25 extending through said portion 23 is substantially concentric with the conical nose 28.

The clamping member 21 includes the split ring 30 having portion 31 and socket 32, the socket portion being adapted to receive the conical nose 28 for securing the clamping members in assembled relation, for which purpose the interior surface of the socket portion is provided with a plurality of serrations designated by numeral 33. Portion 31 is provided with an opening 34 for receiving the head end of the clamping bolt 35, which bolt extends through the rear opening in socket portion 32 to have threaded relation with the threaded opening 25 in portion 23. By rotation of bolt 35 in one direction the split ring 30 is drawn together to effect a clamping action on arm 10 and simultaneously therewith portion 23 is secured in assembled relation with socket portion 32. This action results in securing clamping member 20 to clamping member 21 and it will be observed that said members may be secured in any desired rotative adjustment with respect to each other.

The cone-shaped portion 23 of clamping member 20 is integral with the ring 22 of said member and the portion is disposed with its longitudinal axis substantially tangent to the exterior of said ring 22. The bolts 26 and 35 are positioned on the longitudinal axis of said portion 23 and thus rotative adjustment of the clamping members with respect to each other takes place about said longitudinal axis as the center of rotation. It necessarily follows that the socket portion 32 is substantially concentric with the bolt opening formed in portion 31. Thus, said cone portion 28 and socket portion 32 have interengaging relation to the full extent of their coacting surfaces. In order to permit infinite rotative adjustments of said clamping members with respect to each other the cone 28 is provided with a smooth interior. It is entirely possible for both the socket and the cone to have smooth surfaces. The fact that these interengaging parts of the clamp are formed of conical shape materially increases the effectiveness of their clamping action. In other words, the said interengaging surfaces develop a greater wedging action as a result of their conical shape whereby the parts may be effectively held in adjusted position. However, it may be desirable to provide serrations on either one surface or the other and for purposes of illustration the interior surface of the socket 32 is provided with serrations which have gripping action on the smooth surface of the cone. In all cases the clamps may be adjusted to their rotative position with respect to each other and at the same time the interengaging surfaces will hold the clamps in secured relation to produce a positive and firm securement without placing unnecessary strain on the clamping bolt.

The invention is not to be limited to or by details of construction of the particular embodiment thereof illustrated in the drawings, as various forms of the device will of course be apparent to those skilled in the art without departing from the spirit of the invention or the scope of the claims.

What is claimed is:

1. In a clamp, in combination, a split-ring member having a cone-shaped portion integral therewith and disposed with its longitudinal axis substantially forming a tangent to the exterior surface of the member, a second split-ring member also having a portion integral therewith and adapted to interengage with the cone-shaped portion for securing the members in assembled relation, the portion on the second split-ring member comprising a socket having serrations on its inner surface.

2. In a clamp, in combination, a clamping member in the form of a split-ring having a cone-shaped portion integral therewith and positioned adjacent the split in the ring, said cone-shaped portion being disposed with its longitudinal axis substantially tangent to the exterior of its member and having a smooth exterior surface, a second clamping member in the form of a split ring having an integral socket portion disposed with its longitudinal axis substantially tangent to the exterior of its member, said socket portion having serrations in its surface and being adapted to receive the cone-shaped portion for securing the members in assembled relation, and whereby infinite rotative adjustments of the members with respect to each other is possible.

3. In a clamp as defined by claim 2, additionally including a clamping bolt for one member and which has threaded relation with the cone-shaped portion, and wherein a second clamping bolt is provided for the other member and which also has threaded relation with the cone-shaped portion.

4. In a clamp, in combination, a clamping member in the form of a split ring having a cone-shaped portion integral therewith and positioned adjacent the split in the ring, said cone-shaped portion being disposed with its longitudinal axis substantially tangent to the exterior of its member and having a smooth exterior surface, a second clamping member in the form of a split ring having an integral socket portion disposed with its longitudinal axis substantially tangent to the exterior of its member, said socket portion being adapted to receive the cone-shaped portion to secure the members in desired rotative position, and means having associated relation with said cone-shaped portion for securing said clamping members in assembled relation.

FREDERICK M. LITTELL.

REFERENCES CITED

The following references are of record in the file of this patent:

UNITED STATES PATENTS

| Number | Name | Date |
| --- | --- | --- |
| 699,509 | Finnegan | May 6, 1902 |
| 1,706,215 | Davidson | Mar. 19, 1929 |
| 1,835,473 | Davidson | Dec. 8, 1931 |
| 2,345,910 | Fawcett | Apr. 4, 1944 |